(12) United States Patent
Fenny et al.

(10) Patent No.: US 7,003,949 B2
(45) Date of Patent: Feb. 28, 2006

(54) INTEGRATED THREE FUNCTION VALVE

(75) Inventors: Carlos A. Fenny, Arlington, TX (US); David P. Schultz, Arlington, TX (US); Ian L. Price, Burntwood (GB); David A. Curd, Walsall (GB)

(73) Assignee: Bell Helicopter Textron Inc., Fort Worth, TX (US)

( * ) Notice: Subject to any disclaimer, the term of this patent is extended or adjusted under 35 U.S.C. 154(b) by 126 days.

(21) Appl. No.: 10/490,276

(22) PCT Filed: May 16, 2003

(86) PCT No.: PCT/US03/15292

§ 371 (c)(1),
(2), (4) Date: Mar. 19, 2004

(87) PCT Pub. No.: WO03/098052

PCT Pub. Date: Nov. 27, 2003

(65) Prior Publication Data

US 2004/0237518 A1    Dec. 2, 2004

Related U.S. Application Data

(60) Provisional application No. 60/381,184, filed on May 16, 2002.

(51) Int. Cl.
*F15B 11/08*    (2006.01)
*F15B 13/10*    (2006.01)
(52) U.S. Cl. ............................ 60/468; 91/437; 91/447; 137/596.15; 137/596.16
(58) Field of Classification Search ................. 91/437, 91/447, 509, 510; 60/406, 468; 137/596.15, 137/596.16
See application file for complete search history.

(56) References Cited

U.S. PATENT DOCUMENTS

| | | | | |
|---|---|---|---|---|
| 4,009,642 A | * | 3/1977 | Vanderlaan ................... 91/447 |
| 4,150,686 A | * | 4/1979 | El Sherif et al. ........ 137/596.16 |
| 4,870,819 A | * | 10/1989 | Walzer ......................... 60/422 |
| 5,493,861 A | * | 2/1996 | Friedrichsen ................ 60/328 |

\* cited by examiner

*Primary Examiner*—F. Daniel Lopez
(74) *Attorney, Agent, or Firm*—James E. Walton (57) ABSTRACT

An integrated three function valve (ITFV) that combines the functions of a bypass valve (e.g. 183a, 185a, 161a) into a single assembly is disclosed. The ITFV allows continued operation after any two failures. With the integrated three function valve, no combination of electrical or hydraulic component failures, regardless of expected failure rate, will prevent an actuator from continued safe operation

9 Claims, 14 Drawing Sheets

| SOV PISTON AREA (NOMINAL) | 0.62064 cm² | 0.0962 in² |
|---|---|---|
| SPRING FORCE AT BYPASS | 10.43 kg | 23.0 lb |
| SPRING FORCE AT NULL POSITION | 27.28 kg | 60.16 lb |
| MAXIMUM SPRING FORCE - NORMAL OPERATION | 41.73 kg | 92.0 lb |
| SPRING RATE | 378.96 N/cm ±17.5 N/cm (EACH) | 216.39 lb/in ±10.0 lb/in (EACH) |
| VALVE FLOW - NORMALLY CLOSED SOLENOID VALVE | 14.748 cm³/s AT 20.68 MPa | 0.9 in³/s AT 3,000 psid |
| VALVE FLOW - NORMALLY OPEN SOLENOID VALVE | 16.387 cm³/s AT 20.68 MPa | 1.0 in³/s AT 3,000 psid |
| SWITCHING TIME - SOLENOID VALVE (BOTH TYPES) | <0.02 s AT -6.67°C | <0.02 s AT 20°F |

| PRIMARY SPOOL POSITION | TIME AT TEMPERATURE | | REQUIRED |
| --- | --- | --- | --- |
| | -6.67°C (20°F) | 48.8°C (120°F) | |
| NULL TO PRESSURE RELIEF | 42.5 ms | 42.5 ms | ≤43 ms |
| NULL TO BYPASS | 55 ms | 55 ms | ≤55 ms |
| HARDOVER TO PRESSURE RELEASE | 24.5 ms | 24.5 ms | ≤30 ms |
| HARDOVER TO BYPASS | 37 ms | 37 ms | ≤37 ms |

| | SI UNITS | (CONVENTIONAL UNITS) |
|---|---|---|
| THERMAL NULL SHIFT FOR $\Delta T=10°C$ (50°F), $X_{th}$ | $= 1.66 \times 10^{-5}$ cm/°C | $(1.178 \times 10^{-5}$ in/°F) |
| | $= 1.5 \times 10^{-3}$ cm | $(5.89 \times 10^{-4}$ in) |
| USING NOMINAL SPRING RATE | $= 758.3$ N/cm | $(432.8$ lb/in) |
| NOMINAL CONTROL AREA | $= 0.07310$ cm$^2$ | $(0.01133$ in$^2$) |
| THERMAL NULL SHIFT FOR 50°F$\Delta T$ | $= 0.15$ MPa | $(22.5$ psi) |
| SPOOL FRICTION (PER LANE) = 2.2 N Max$^m$ (0.5 lb) | $= 0.30$ MPa (ASSUMED VALUE) | $(44.13$ psi) (ASSUMED VALUE) |
| DIMENSION TOLERANCE (PER LANE) ERROR | $= \pm 4.90\%$ OF READING | $= \pm 4.90\%$ OF READING |
| | $= 1.06$ MPa AT 21.68 MPa | $= 147$ psi AT 3,000 psi |
| LVDT ERROR (PER LANE) | $= \pm 2\%$ HALF RANGE (27.58 MPa) | $= \pm 2\%$ HALF RANGE (4,000 psi) |
| | $= 0.41$ MPa AT 21.68 MPa | $= 60$ psi AT 3,000 psi |
| LVDT ERROR OVER $\Delta T$ RANGE OF 10°C (50°F) | $= 1\%$ HALF RANGE PER 10°C | $= 1\%$ HALF RANGE PER 50°C |
| | $= 0.21$ MPa AT 21.68 MPa | $= 30$ psi AT 3,000 psi |
| TOTAL $\Delta P$ SENSE ERROR BETWEEN ACTUATORS | $= 4.14$ MPa AT $\pm 21.68$ MPa | 555 psi AT $\pm 3,000$ psi |

INTEGRATED THREE FUNCTION VALVE

This application claims the benefit of Provisional Application No. 60/381,184, filed May 16, 2002.

TECHNICAL FIELD

The present invention relates to actuation systems for aircraft. In particular, the present invention relates to fly-by-wire rotor actuation systems for tiltrotor aircraft.

DESCRIPTION OF THE PRIOR ART

Compared with conventional fixed wing commercial aircraft, the task of designing helicopter flight control systems to avoid flight critical failure modes is considerably more challenging. For typical fixed wing commercial aircraft, flight control system redundancy can be provided through the application of multiple independently actuated surfaces. An example of this methodology is the use of two or three ailerons per wing. Configured in this manner, continued safe flight is achieved in the event of an aileron becoming uncontrollable or seized.

On the other hand, in helicopters and tiltrotor aircraft, application of multiple independently actuated rotors to provide flight control system redundancy is not a viable option. Typically in rotor systems, multiple flight control actuators are structurally or mechanically linked together to provide redundancy of actuation. This methodology provides for continued safe flight following the failure of a system or actuator, except for cases where a failed actuator cannot be freely backdriven, or bypassed, by the remaining actuators. For these failure modes, the result will be loss of rotor control. Therefore, it is a critical requirement for rotor control actuators that their designs incorporate devices that can reliably ensure that a failed actuator can be overridden. For hydraulic actuators, this implies ensuring a bypass condition.

In conventional fly-by-wire (FBW) rotor control actuation, triple hydraulic redundancy is achieved by employing a dual tandem configuration, i.e., two rams end to end. A switching valve is used to connect two independent hydraulic sources to one of the tandem rams. This ram is controlled by dual redundant electrohydraulic valves and dual redundant signals from a flight control computer (FCC). Typically, the tandem ram configuration is supported with spherical bearings or universal joints to minimize structural bending loads.

Figure 1A:
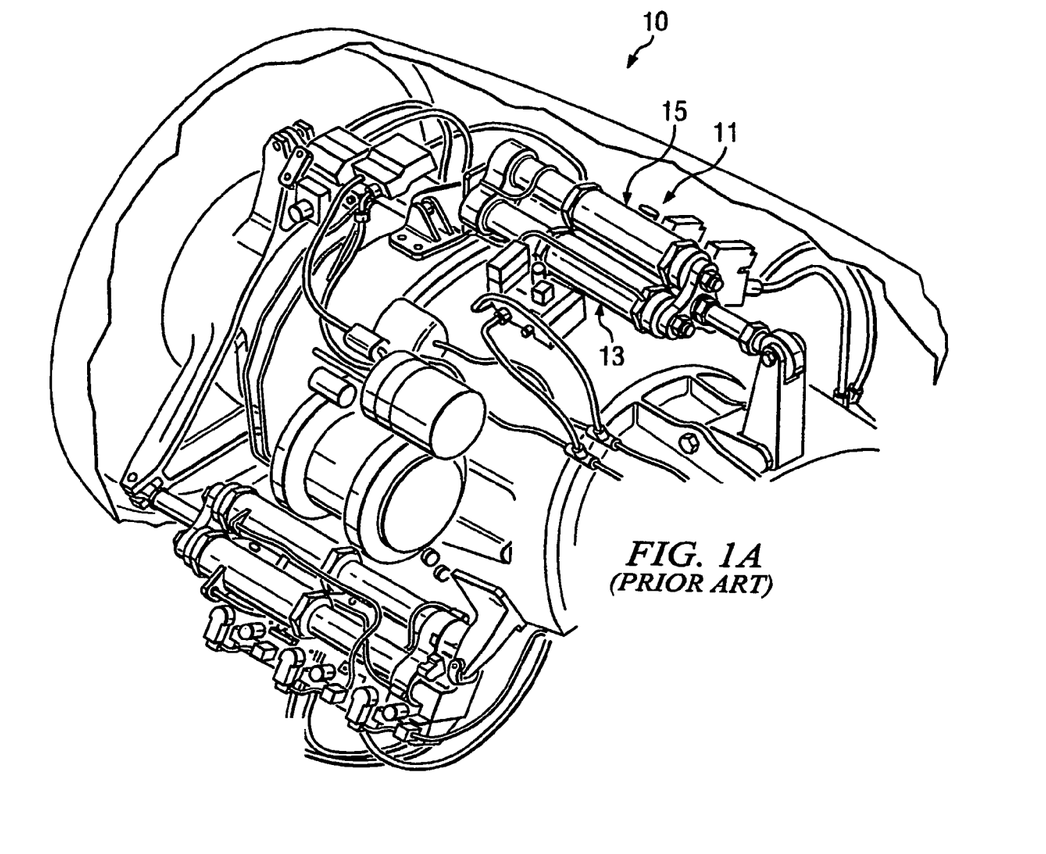
FIGS. 1A and 1B are perspective views of a prior-art FBW rotor control system having three hydraulic rams arranged side-by-side in a triangular pattern.
Figure 1B:
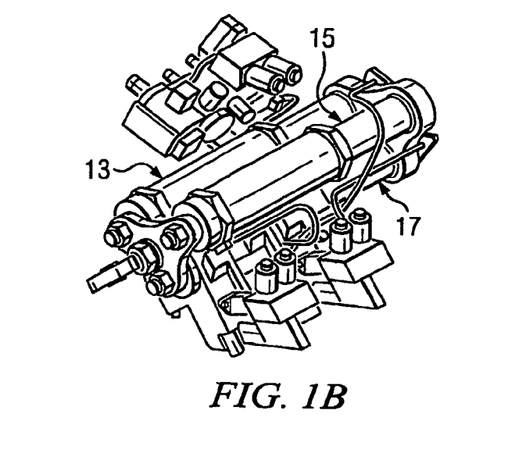

Referring to FIG. 1 in the drawings, another type of FBW rotor control system, one having three hydraulic rams arranged side-by-side in a triangular pattern, is illustrated. As is shown in FIG. 1, a rotor control system 10 for the left hand nacelle of a tiltrotor aircraft includes a triplex collective actuator 11 in which each of three rams 13, 15, 17 is hydraulically powered and controlled from one of three independent manifolds, hydraulic systems, and FCC's. By using three rams instead of two, this configuration has the advantage of eliminating the need for hydraulic switching valves, control systems, and their associated failure modes. Degradation of actuator load/rate capacity following a single failure and the severity of transient motions from control failures are also improved by having two rams continuing to operate instead of only one following a single failure.

Figure 2:
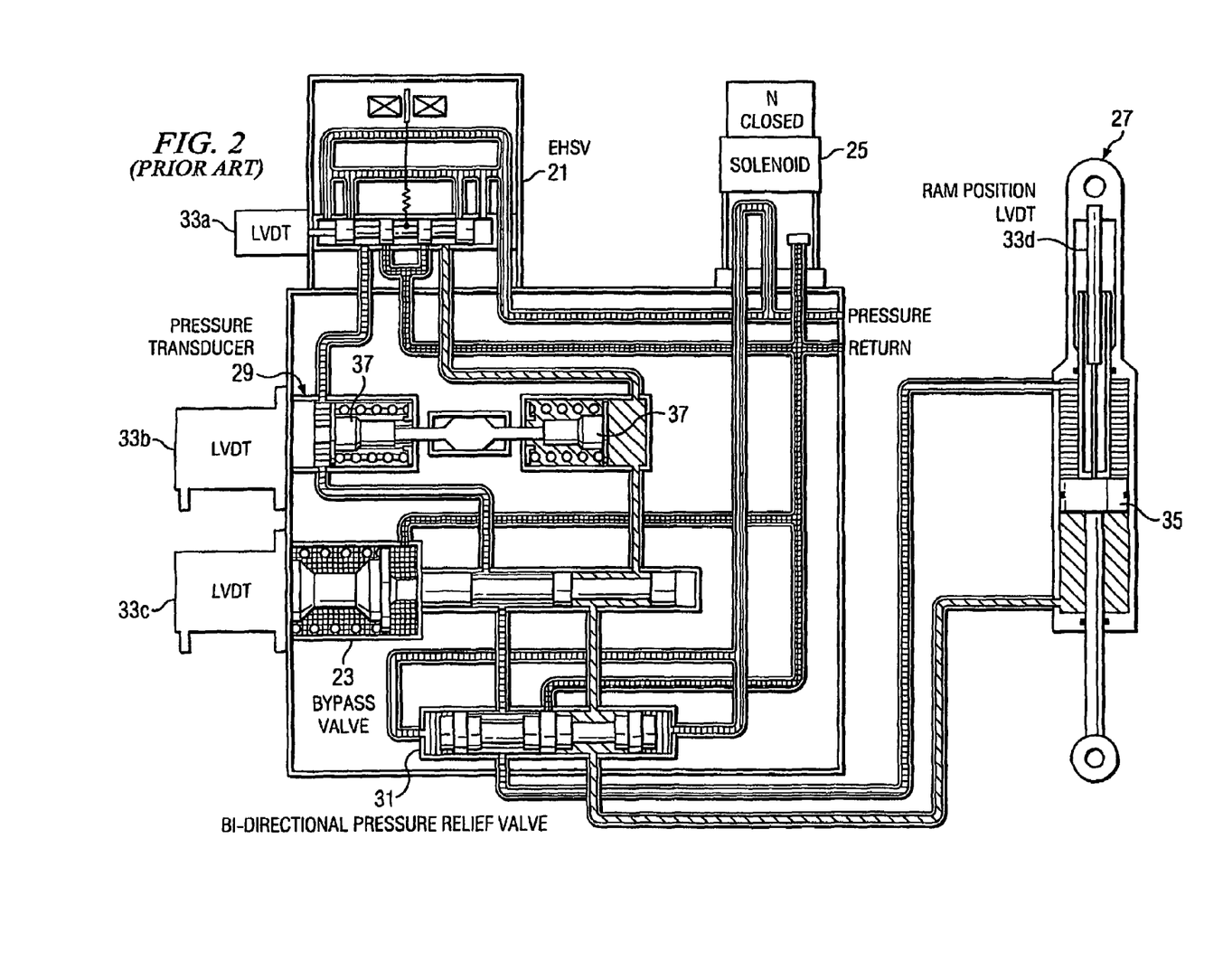
FIG. 2 is a schematic of the collective actuator hydraulic manifold for the FBW rotor control system of FIG. 1.
Figure 3A:
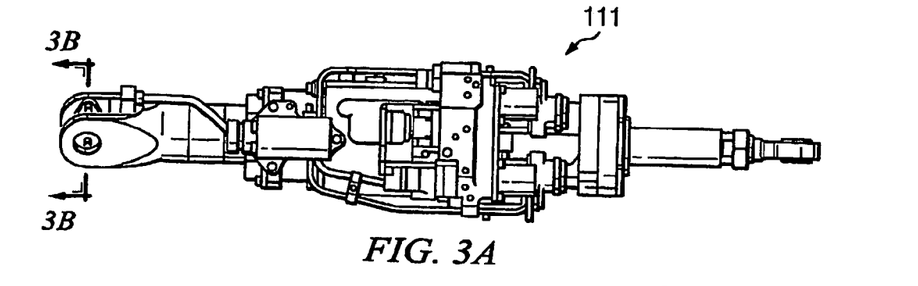
FIGS. 3A–3F are orthographic views of a ITFV collective actuator according to the present invention.
Figure 3B:
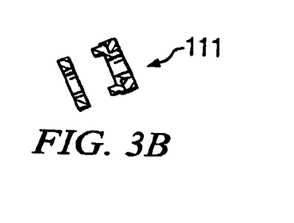
Figure 3C:
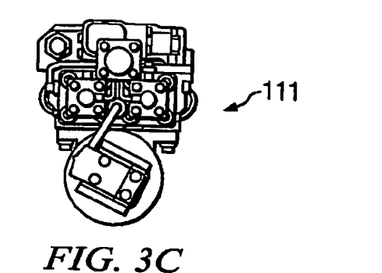
Figure 3D:
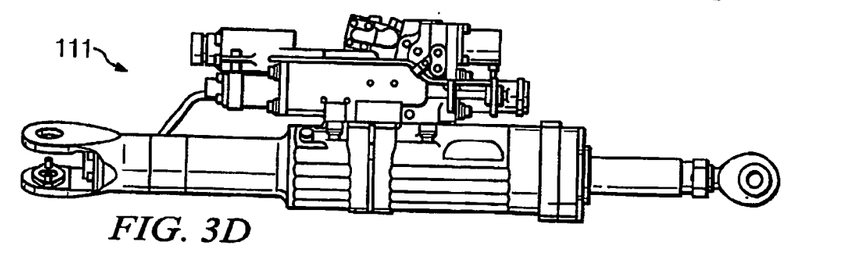
Figure 3E:
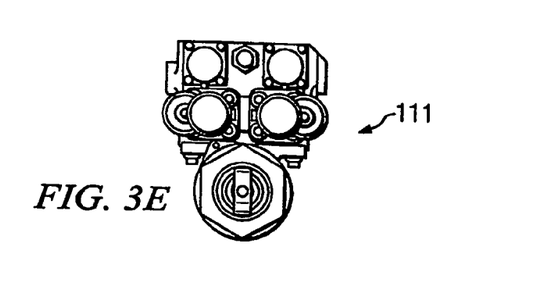
Figure 3F:
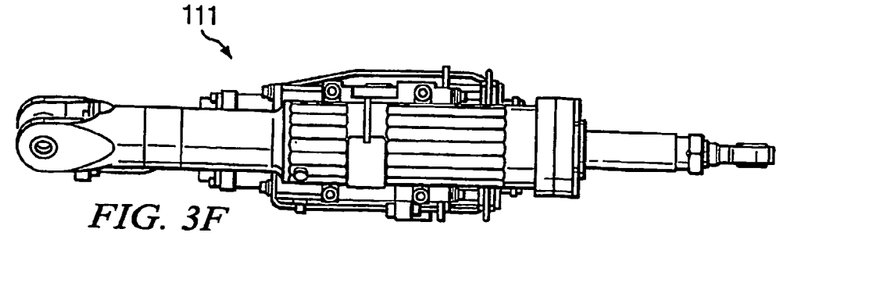

Referring now to FIG. 2 in the drawings, each collective actuator hydraulic manifold comprises an electrohydraulic servo-valve (EHSV) 21, a bypass valve 23 controlled by a solenoid valve 25 to disengage a cylinder 27 in the event of a fault, a differential pressure sensor 29 to allow force balancing across the triple active cylinders to minimize bending loads (a load control concept used in various configurations on other aircraft), and a pressure relief valve 31 to limit cylinder pressures during adverse failure conditions. For each system, four linear variable displacement transducers (LVDT) 33a, 33b, 33c, 33d are fitted for control and monitoring of the spool of EHSV 21, the spool of bypass valve 23, the spool of differential pressure sensor 29, and a ram piston 35 of cylinder 27, respectively.

Differential pressure sensor 29 includes spring centered pistons 37 with one side ported to extend pressure and the other to retract pressure. The displacement of sensor pistons 37 is measured by LVDT 33c and is proportional to the delta pressure acting on ram piston 35.

Although the foregoing designs represent considerable advancements in the area of rotor control systems, significant shortcomings remain.

SUMMARY OF THE INVENTION

There is a need for a rotor control system for an aircraft that provides full triple redundancy.

Therefore, it is an object of the present invention to provide a rotor control system that provides full triple redundancy.

This object is achieved by providing an integrated three function valve (ITFV) that combines the functions of a bypass valve, a pressure relief valve, and a differential pressure transducer into a single assembly. The ITFV of the present invention allows continued operation after any two failures. With the integrated three function valve of the present invention, no combination of two electrical or hydraulic component failures, regardless of expected failure rate, will prevent an actuator from continued safe operation.

The present invention provides for safe operation of an aircraft by ensuring that electrical and hydraulic component failures do not lie dormant in the actuator, such as when a component is not used during normal operation, or when a component is not capable of being periodically tested. For example, the present invention provides for safe operation of an aircraft in the presence of the following dormant failures:

1. An EHSV failure, hardover or at null position, in combination with failure to bypass the cylinder. The degradation in load rate capacity resulting from the combination of driving flow across the relief valve on the failed cylinder and increased friction from bending is not acceptable.
2. An EHSV sticking at null position combined with the sticking of the pressure relief valve (PRV), a dormant failure. With this type of failure, acceptable ram pressures can be exceeded. Although this condition can be overridden by a bypass valve, it is considered that the total time required between failure detection and achieving bypass is not adequate to protect the failed ram from a spike of overpressurization. This condition is a greater problem for the triplex ram than for the duplex ram, as the peak load can be three times the design stall, i.e., two active rams at stall plus air load; compared to twice the stall, i.e., one active ram at stall plus air load. Therefore, with an aircraft system operating pressure of 21.68 MPa (3,000 psi), this failure combination can generate a pressure spike of 62.05 MPa (9,000 psi). This type of failure on a triple ram system can exceed normal design burst conditions of 1.71 MPa (7,500 psi) burst pressure required for 21.68

MPa (3,000 psi) system actuators, unless excessive weight is added to accommodate the failure mode.

3. A loss of two hydraulic or two FCC systems combined with the dormant failure of a PRV. The ram controlled by the one remaining functioning system will be required to react all flight loads. If the ram on the remaining system contains a PRV that opens at pressures below system operating pressure, control of the actuator can be lost. A preflight built-in test (PFBIT) can be incorporated into the FCC's to load each ram to stall in order to confirm that the PRV's do not open below system pressure. However, this subjects the actuator and structure to severe fatigue loads.

4. In the event of the loss of one ram due to FCC or hydraulic system failure, the two functioning rams should equally support actuator flight loads. However, if a failure mode of a delta pressure sensor results in a pressure indication opposite in direction of the actual ram load, a force fight between the remaining two actuators can result in the frequency response of the actuator becoming severely degraded. In addition to these double failure modes, a change of sensitivity of a differential pressure sensor can lead to increased fatigue due to an increased force fight between the triple actuators.

The present invention provides many significant benefits and advantages, including: (1) bypass valve function is redundant and independent; (2) confirmation of redundant bypass valve operation is available during PFBIT, and continuous health monitoring is possible in certain applications; (3) PRV function is redundant and independent; (4) confirmation of PRV operation is available during PFBIT, and continuous health monitoring is possible in certain applications (5) redundant delta pressure sensors are provided to permit continuous cross checking of accuracy; (6) delta pressure sensors are robust and free from common mode changes in accuracy; and (7) additional actuator redundancy does not require any additional wiring or changes to existing FCC interfaces.

DESCRIPTION OF THE PREFERRED EMBODIMENT

Referring now to FIGS. 3A–3F in the drawings, the preferred embodiment of an ITFV 111 according to the present invention is illustrated. ITFV 111 utilizes two hydraulic spools to combine the functions of bypass valve, pressure relief valve, and delta pressure transducer into a simple and compact assembly. When used as a matched pair in a collective actuator, ITFV's 111 provide redundant bypass valve, pressure relief valve, and delta pressure transducer functionality. This allows certain redundancy and monitoring requirements to be met with fewer springs, hydraulic spools, and pistons than other actuator designs.

Figure 4:
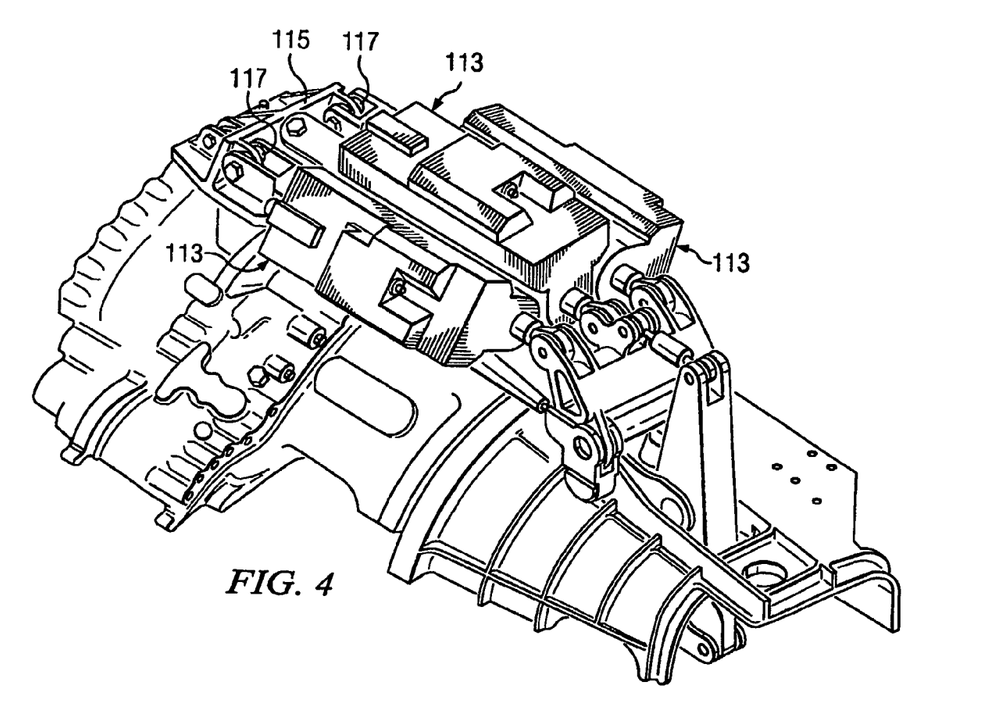
FIG. 4 is a partial perspective view of a left hand nacelle of a tiltrotor aircraft having ITFV's according to the present invention.

Referring now to FIG. 4 in the drawings, three collective actuators 113 are shown installed in the left hand nacelle of a tiltrotor aircraft. Each collective actuator 113 utilizes a matched pair of ITFV's 111, and is configured to create unequal extend and retract areas to better match predicted flight loads and reduce transient effects. Flight loads are predominantly in tension. In order to minimize ram bending and associated frictional effects, collective actuators 113 are positioned in a plane side-by-side, and are interconnected by a rigid bracket 115 on the control surface via spherical bearings 117 on each collective actuator 113. This configuration and structural attachment permits ITFV's 111 to fit within the available aircraft space envelope.

Referring now to FIGS. 5–12 in the drawings, a dual ITFV manifold assembly 151 having a matched pair of ITFV's 111a and 111b according to the present invention is shown schematically to illustrate the operation of the present invention. Although it will be appreciated that other porting configurations through ITFV's 111a and 111b are possible, the configuration shown in FIGS. 5–12 is particularly well suited for use in the tiltrotor aircraft application of the present invention. Dual ITFV manifold 151 contains an EHSV 153 with an LVDT 155 to monitor spool position. ITFV 111a is comprised of a pilot spool 157a, a primary spool 159a, an LVDT 161a that senses primary spool position, and two spool centering springs 163a and 165a. ITFV 111b is comprised of a pilot spool 157b, a primary spool 159b, an LVDT 161b that senses primary spool position, and two spool centering springs 163b and 165b. In the tiltrotor aircraft application used herein, this configuration is possible without requiring any new wiring or FCC interface changes.

Two solenoid valves 167 and 169 are utilized to control the bypass function for the pair of ITFV's 111a and 111b pair. Solenoid valve 167 is deenergized "off" to drive the primary spool engaged position, and solenoid valve 169 is deenergized "on" to control chip shear pressure. The coils of each of the solenoid valves 167 and 169 are wired in parallel. Thus, no FCC or wiring changes are required. Solenoid valves 167 and 169 are configured this way to achieve a high chip shear capability, to bypass, when no failures exist, while ensuring that bypass can be achieved should either solenoid valve 167 or 169 fail to deenergize.

Figure 5:
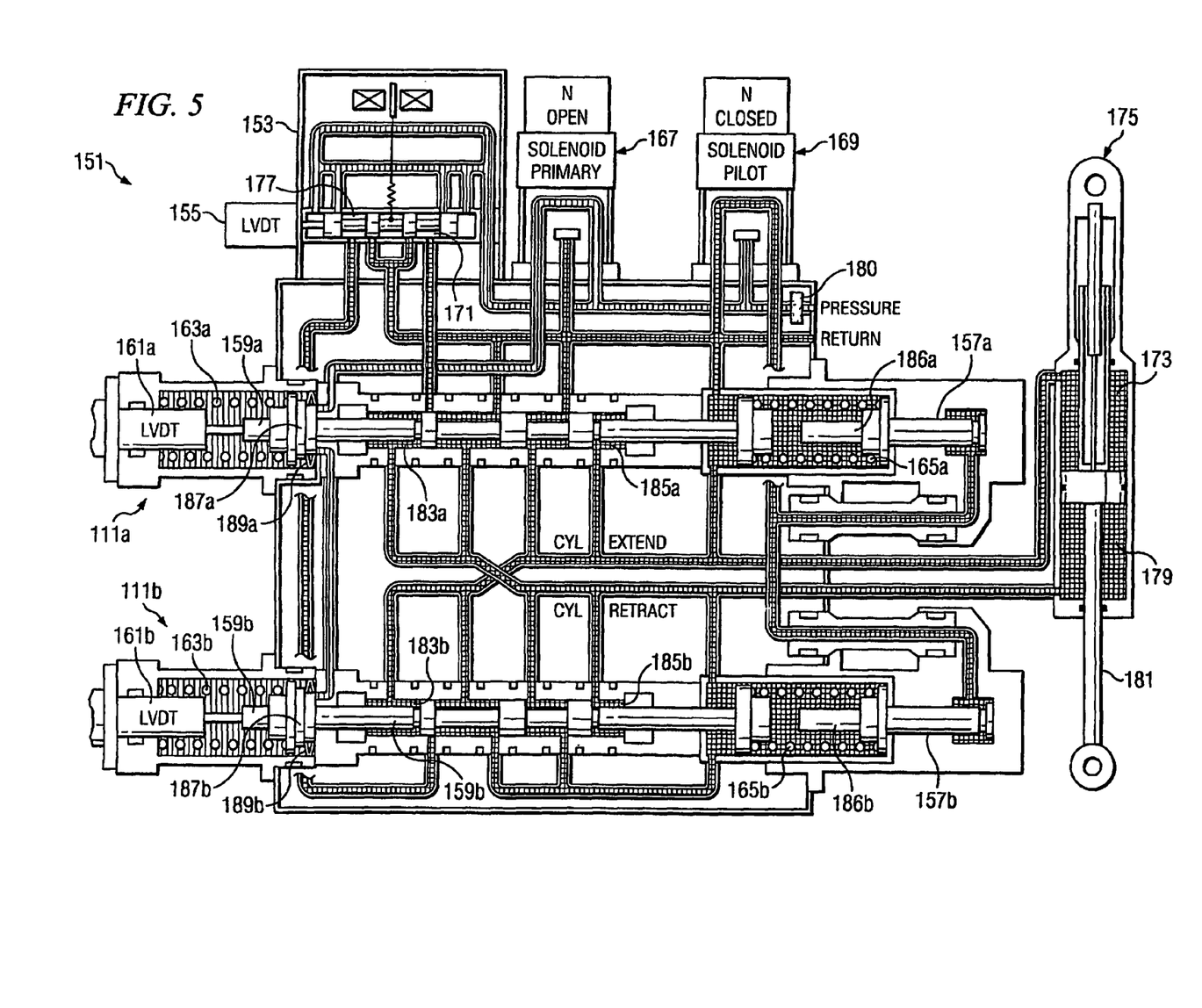
FIGS. 5–12 are schematics of the preferred embodiment of the ITFV according to the present shown in various operating states.

In FIG. 5, ITFV assembly 151 is shown in a bypass mode, i.e., solenoid valves 167 and 169 in the "off" position. In the bypass mode with the hydraulic system at operating pressure, system flow is ported to the left side of primary spools 159a and 159b, through primary spool solenoid valve 167, to the pilot solenoid valve 169, and to EHSV 153. With solenoid valves 167 and 169 deenergized, primary spools 159a and 159b and pilot spools 157a and 157b are held in bypass position by springs 163a, 163b, 165a, and 165b. Primary spools 159a and 159b are also held in bypass position by system pressure.

Primary spool LVDT's 161a and 161b provide confirmation to the FCC (not shown) of bypass mode. Flow from a "retract" EHSV control port 171 to the retract side 173 of an actuator cylinder 175 is blocked by the primary spool 159a.

Flow from an "extend" EHSV control port 177 to an extend side 179 of actuator cylinder 175 is blocked by the primary spool 159b. This configuration isolates EHSV 153 from actuator cylinder 175 in bypass mode, but permits EHSV 153 to be cycled for PFBIT and independent performance checks. In bypass mode, primary spools 159a and 159b connect both extend and retract cylinder ports 171 and 177 to return and, indirectly, to each other. This allows a shaft 181 of actuator cylinder 175 to be moved freely by other actuators in bypass mode. Because the unequal area pistons are utilized in ITFV's 111, makeup flow from return prevents cavitation.

Figure 6:
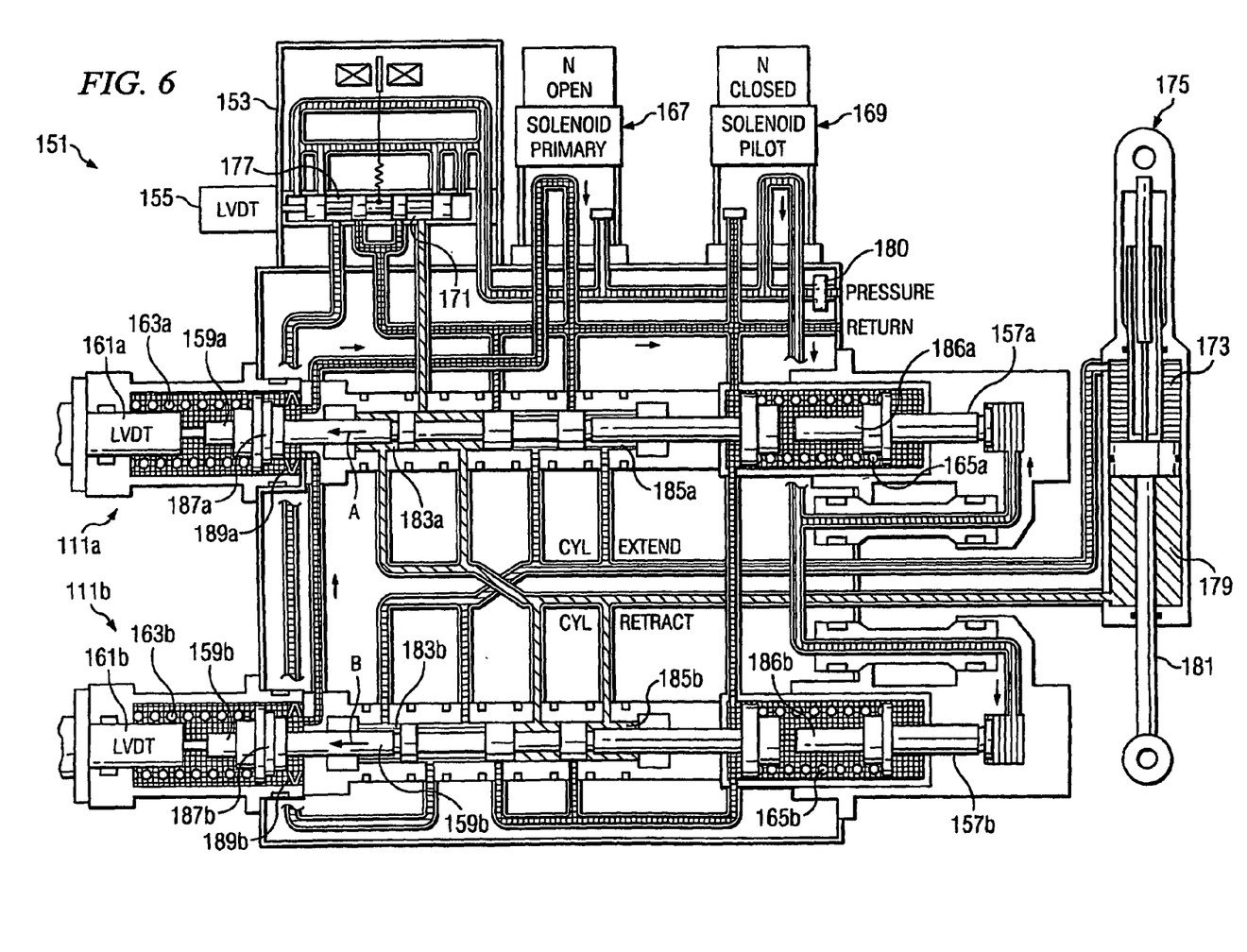

Referring now to FIG. 6 in the drawings, ITFV assembly 151 is shown with EHSV 153 at a null, or center, position with solenoid valves 167 and 169 in the engaged "on" mode. With EHSV 153 at null, system flow to the ram ports is blocked by EHSV 153. In the engaged mode with pilot solenoid valve 169 energized, system flow is ported from pilot solenoid valve 169 to the right side of pilot spools 157a and 157b, driving pilot spools 157a and 157b left to an engaged position. Engagement of primary solenoid valve 167 replaces system pressure with return pressure on the left side of primary spools 159a and 159b. This allows primary spools 159a and 159b to be centered by the equal preload forces of springs 163a, 165a, 163b, and 165b, respectively.

LVDT's 161a and 161b attached to primary spools 159a and 159b provide confirmation to the FCC that the engaged mode has been achieved. In engaged mode, flow from the retract EHSV control port 171 is connected through a left side differential area chamber 183a of primary spool 159a to the retract side 173 of actuator cylinder 175. Left side differential area chamber 183a of primary spool 159a is also ported to a right side differential area chamber 185b of primary spool 159b. Symmetrically, flow from extend EHSV control port 177 is connected through left side differential area chamber 183b of primary spool 159b to the extend side 173 of actuator cylinder 175. Left side differential area chamber 183b of primary spool 159b is also ported to a right side differential area chamber 185a of primary spool 159a.

Left and right side differential area chambers 183a, 185a, 183b, and 185b of primary spools 159a and 159b are created by the difference in diameter between three center lands and smaller end lands of primary spools 159a and 159b. The smaller end lands of primary spools 159a and 159b are equal in diameter. Therefore, the differential areas on the left and right sides of primary spools 159a and 159b are equal. When EHSV 153 is at null, pressures at left and right differential area chambers 183a, 185a, 183b, and 185b are equal. Therefore, hydraulic forces on primary spools 159a and 159b are balanced, and primary spools 159a and 159b remain at the spring centered positions. These positions, as indicated by primary spool LVDT's 161a and 161b, are interpreted by the FCC as zero differential pressure between extend and retract sides of actuator cylinder 175.

Figure 7:
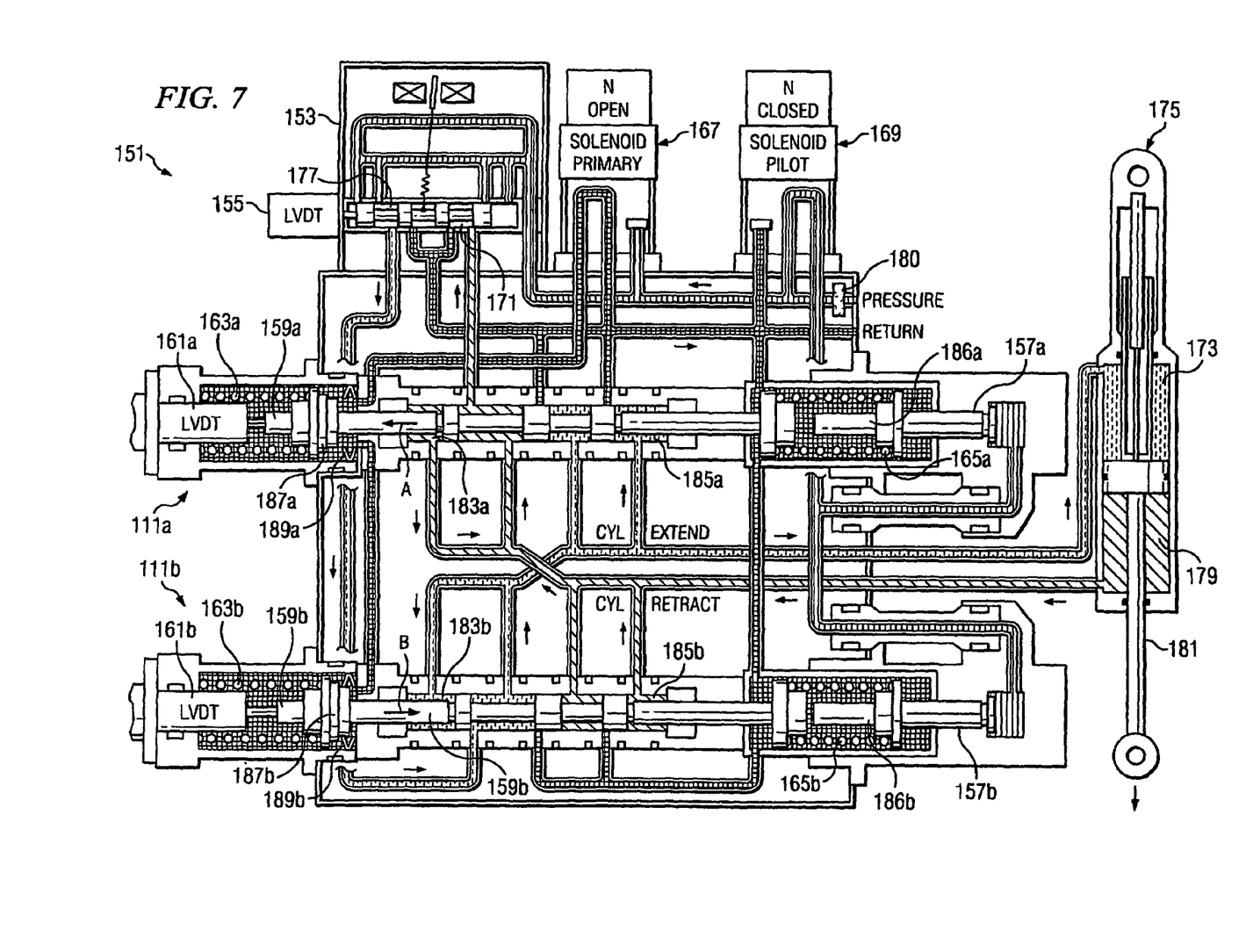

Referring now to FIG. 7 in the drawings, ITFV assembly 151 is shown engaged with solenoid valves 167 and 169 energized, and with EHSV 153 responding to an "extend" computer command from the FCC. EHSV 153 directs system flow to extend side 173 of actuator cylinder 175 and connects retract side 179 of actuator cylinder 175 to return. Pressure generated at extend side 173 of actuator cylinder 175 will be proportional to any load restricting actuator movement. Increasing extend side pressure in left side differential area chamber 183b of primary spool 159b and return pressure in right side differential chamber 185b of primary spool 159b results in a net force that displaces primary spool 159b to the right, as is indicated by arrow A. Because primary spool 159b is centered by fixed rate identical springs 163b and 165b, spool displacement is proportional to the differential pressure between extend side 173 and retract side 179 of actuator cylinder 175.

Displacement of primary spool 159b resulting from increased extend pressure causes LVDT 161b to generate an indication to the FCC of the compression load acting on the actuator. Under increasing extend side pressure, primary spool 159a reacts identical to primary spool 159b, with the exception of direction of displacement, as indicated by arrow A. Because right side differential area chamber 183a of primary spool 159a is ported to extend pressure and left side differential area chamber 185a is connected to return pressure, primary spool 159a displaces to the left with increasing differential pressure between extend side 173 and retract side 179 of actuator cylinder 175.

Figure 8:
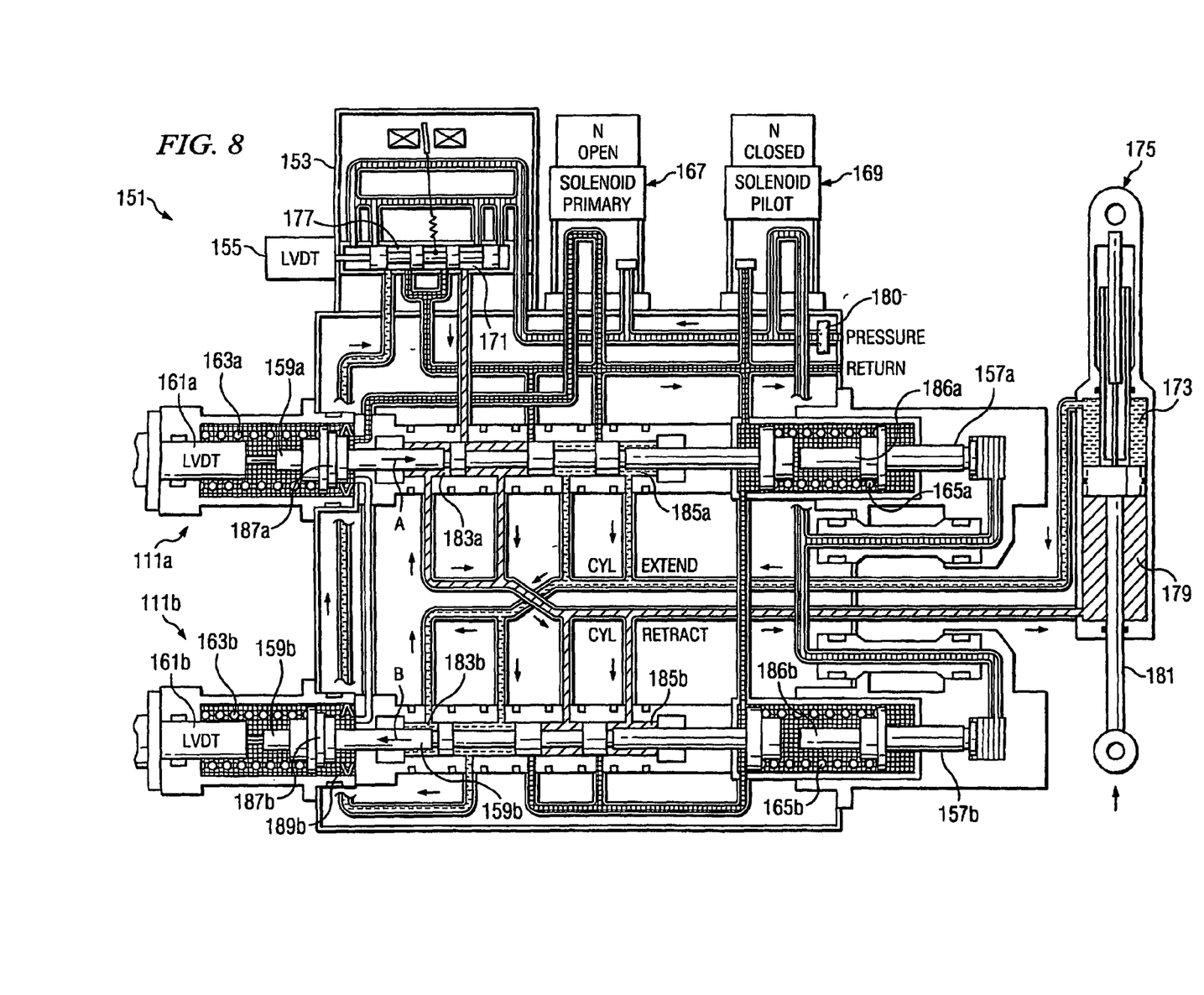

Referring now to FIG. 8 in the drawings, the relief valve functions of ITFV's 11a and 111b will be described. Because ITFV's 111a and 111b operate in opposite directions, when acting as delta pressure sensors, the possibility of a common mode failure affecting both sensors accuracy equally is extremely remote. Except for a reversal of the direction of spool displacement and indicated load resulting from differential pressure between extend side 173 and retract side 179 of actuator cylinder 175, response of primary spools 159a and 159b with increasing retract side cylinder pressure is the same as described for increasing extend pressure. In the event actuator cylinder 175 is subjected to external loads exceeding acceptable structural limits, primary spools 159a and 159b function as relief valves to vent excessive extend or retract cylinder pressure to return.

Figure 9:
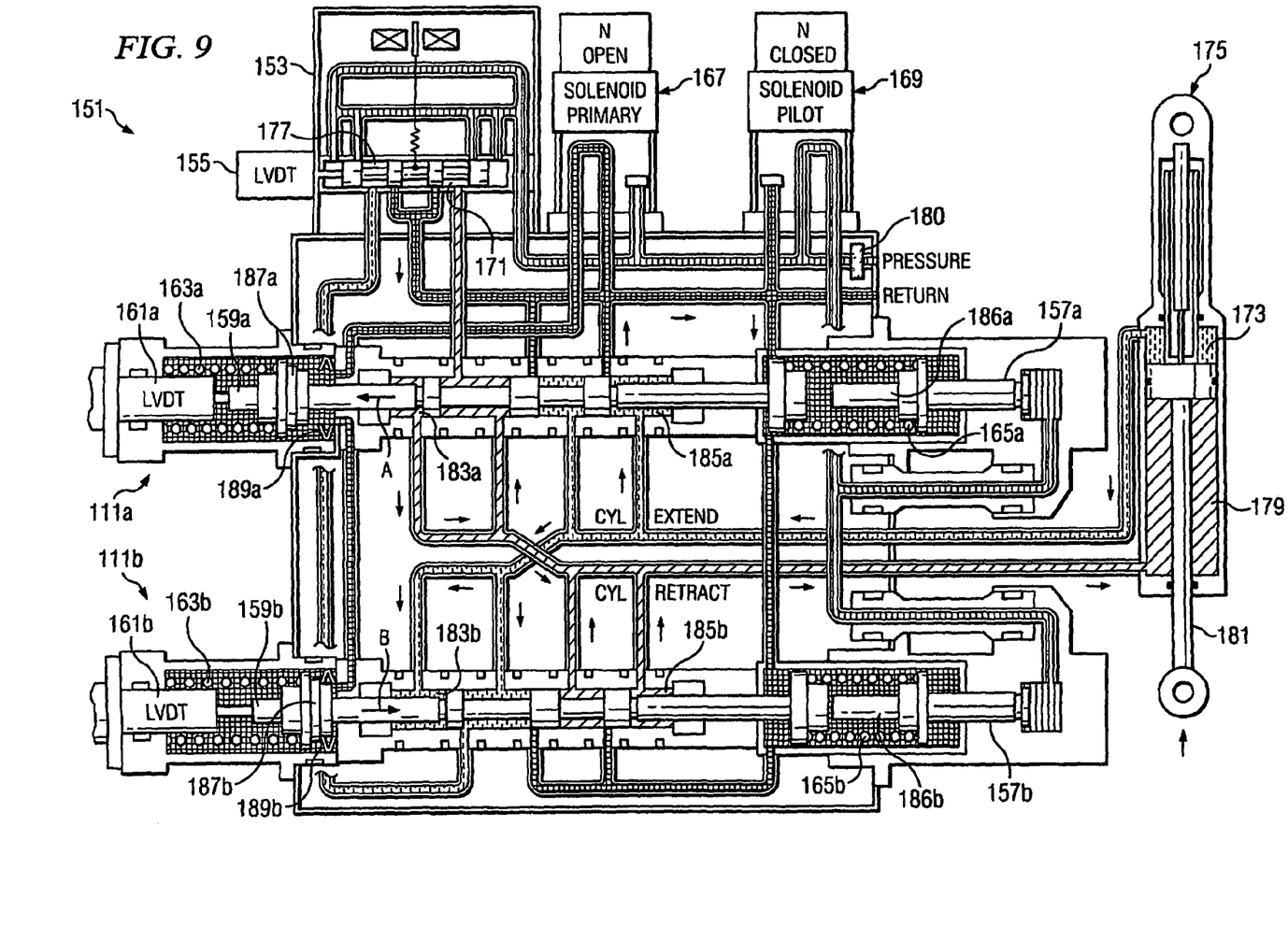

Referring now to FIG. 9 in the drawings, ITFV assembly 151 is shown engaged with solenoid valves 167 and 169 energized, and with EHSV 153 in the null position blocking extend port 177 and retract port 171 from return or system pressure. When actuator cylinder 175 is subjected to excessive external compressive load, pressure generated at extend side 173 of actuator cylinder 175 exceeds the relief valve function opening pressure of 27.58 MPa (4,000 psi). At 27.58 MPa (4,000 psi) extend side pressure, left side differential area chamber 183b of primary spool 159b generates a net force that displaces primary spool 159b sufficiently to the right to uncover ports and vent excessive pressure to return. Primary spool 159a reacts identically to primary spool 159b, with the exception of the direction of displacement.

Figure 10:
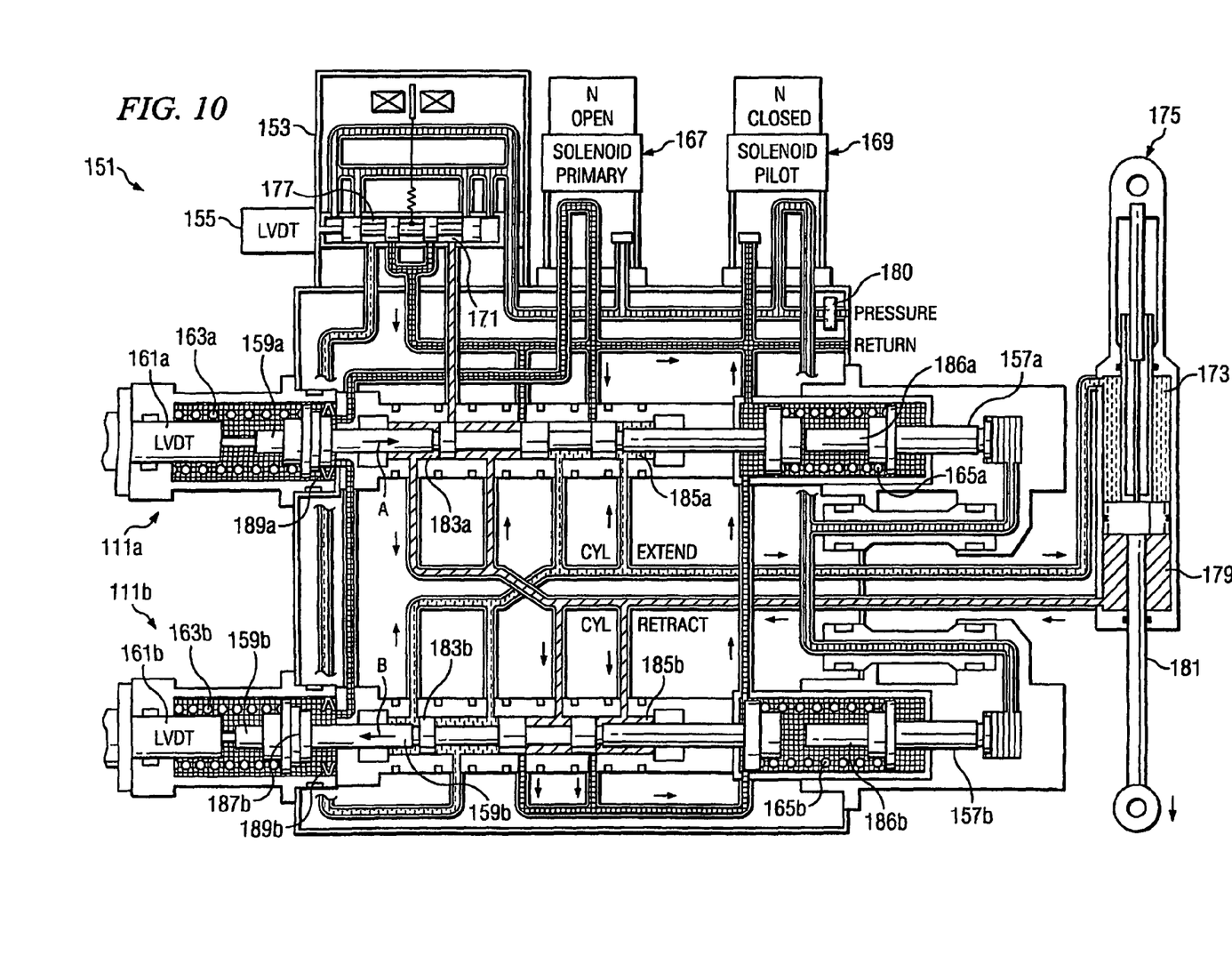

Referring now to FIG. 10 in the drawings, response of primary spools 159a and 159b with 27.58 MPa (4,000 psi) retract side cylinder pressure caused by excessive tension load is the same as described for 27.58 MPa (4,000 psi) extend pressure, except for a reversal of the direction of spool displacement resulting from differential pressure between extend side 173 and retract side 179 of actuator cylinder 175. Cavitation protection during pressure relief is provided when paired ITFV's 111a and 111b are incorporated on unequal area cylinders. Primary spools 159a and 159b, venting excessive cylinder pressure in the same direction as the normal bypass function, connect both cylinder ports to return to prevent cavitation. Because the same centering springs 163a, 165a, 163b, and 165b and hydraulic components that support the delta pressure measurement function are also used to provide relief of excessive pressure, the integrity of the ITFV relief valve function is continuously monitored in flight.

When changing from the engaged to the bypass mode, as illustrated in FIGS. 6 and 5, respectively, solenoid valves 167 and 169 are deenergized. This causes preload in centering springs 163a, 165a, 163b, and 165b to return pilot spools 157a and 157b to their disengaged stops. Concurrently, the solenoid valve 167 feeds system pressure, if available, to the left end of both primary spools 159a and 159b. System pressure acting on the end areas of primary spools 159a and 159b generates an 890 N (200 lb) force to move primary spools 159a and 159b to the right. This force works in combination with preloaded springs 163a, 165a, 163b, and 165b to provide primary spool chip shear capability when bypass is commanded. This chip shear capability ensures that debris that is not filtered by a supply line filter 180 does not prevent movement of primary spools 159a and 159b. Filter 180 is preferably a 100-micron filter.

For the failure mode where one of primary spools 159a or 159b sticks and fails to move into bypass position, the other primary spool 159a or 159a provides the conditions for bypass. In the event that solenoid valve 167 fails to port system pressure to primary spools 159a and 159b, the preload of centering springs 163a, 165a, 163b, and 165b is sufficient to move primary spools 159a and 159b into bypass position. For the failure modes where solenoid valve 169 fails to open, or a pilot spool 157a or 157b sticks in the engaged position, the 890 N (200 lb) force from system pressure acting on the left end of primary spools 159a and 159b is sufficient to compress centering springs 163a, 165a, 163b, and 165b and move pilot spool 157a and 157b into the bypass position. Because the same centering springs 163a, 165a, 163b, and 165b and hydraulic components supporting the delta pressure measurement function are also used to provide bypass, the integrity of the ITFV bypass function is continuously monitored in flight, with the exception of the solenoid valves.

Because deenergizing either solenoid valve 167 or 169 will cause both ITFV's 111a and 111b to enter bypass mode, failure of one of these solenoid valves 167 or 169 could lay dormant. To permit the PFBIT to identify if either solenoid valves 167 or 169 has failed, ITFV assembly 151 is configured to stop primary spools 159a and 159b just short of the normal bypass position if either solenoid valve 167 or 169 has failed. The correspondingly incorrect LVDT output for the bypass position, provides the FCC with an indication of a failure of either solenoid valve 167 or 169.

Figure 11:
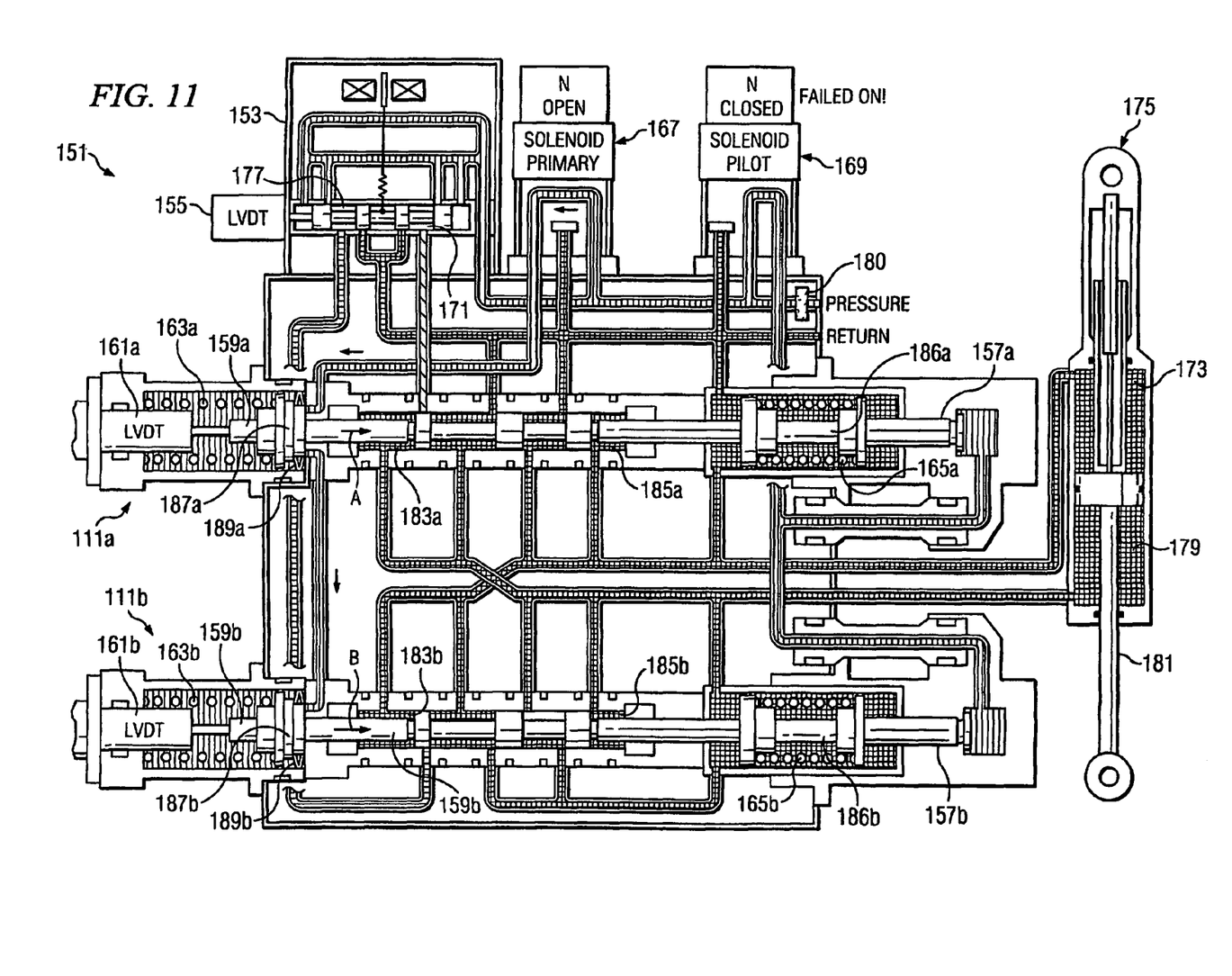
Figure 12:
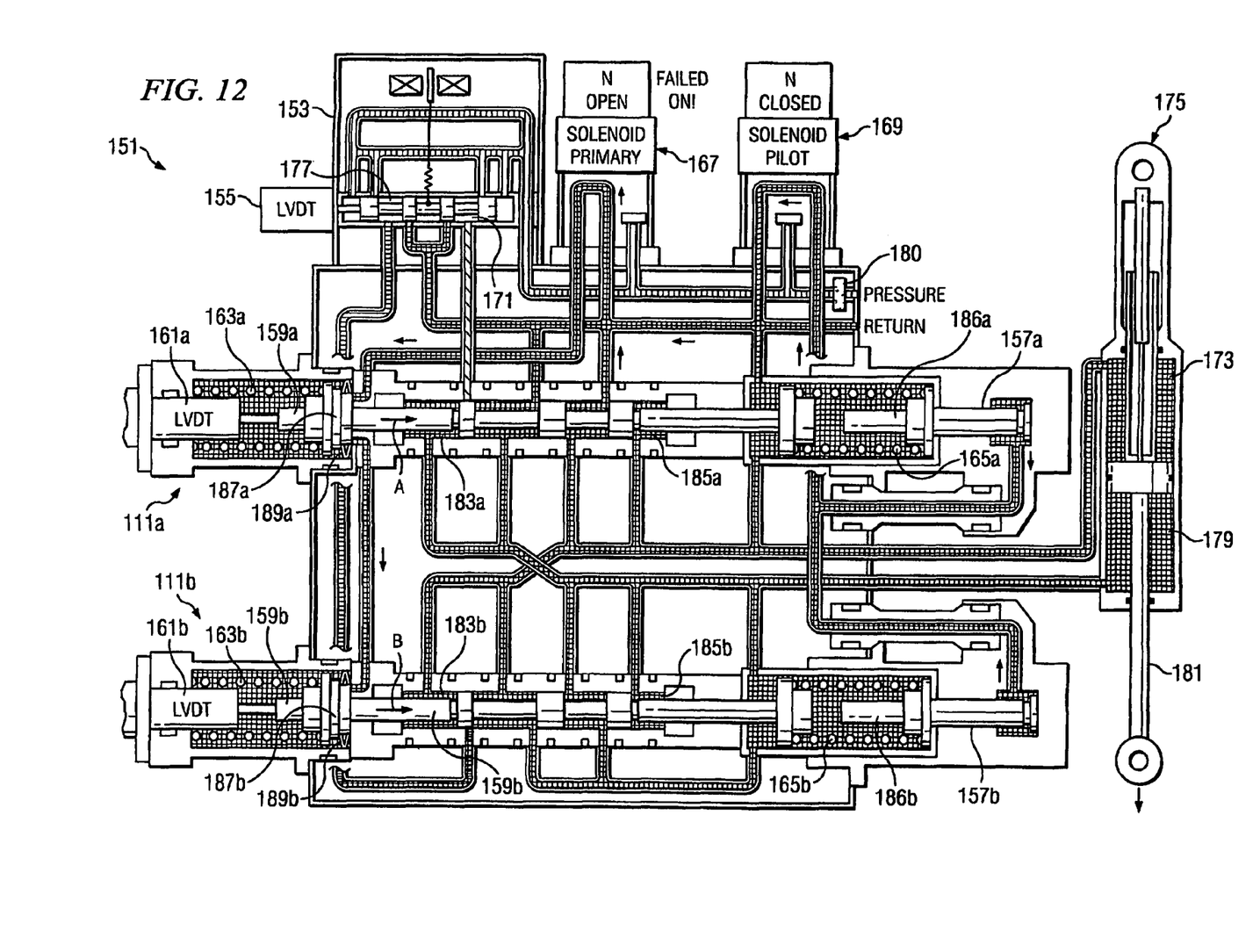

Referring now to FIGS. 11 and 12 in the drawings, implementation of this feature is as follows:
1. As shown in FIG. 11, in the case where solenoid valve 169 has failed, pilot spools 157a and 157b remain in the engaged position. To halt primary spools 159a and 159b just short of the full bypass position, the right ends of primary spools 159a and 159b contact stops 186a and 186b that extend out from the left ends of pilot spools 157a and 157b. System pressure acting on the left end of primary spools 159a and 159b is sufficient to compress centering springs 163a, 165a, 163b, and 165b, but not enough to move pilot spools 157a and 157b.
2. As is shown in FIG. 12, in the case where solenoid valve 167 has failed, pilot spools 157a and 157b move to the disengaged position. To halt primary spools 159a and 159b just short of the full bypass position, Bellville spring washers 189a and 189b are employed on primary spool bypass position stops 187a and 187b. The spring rate of washers 189a and 189b is sufficient to halt primary spools 159a and 159b from achieving a normal bypass position, unless system pressure is supplied through solenoid valve 167 to primary spools 159a and 159b.

Figure 13:
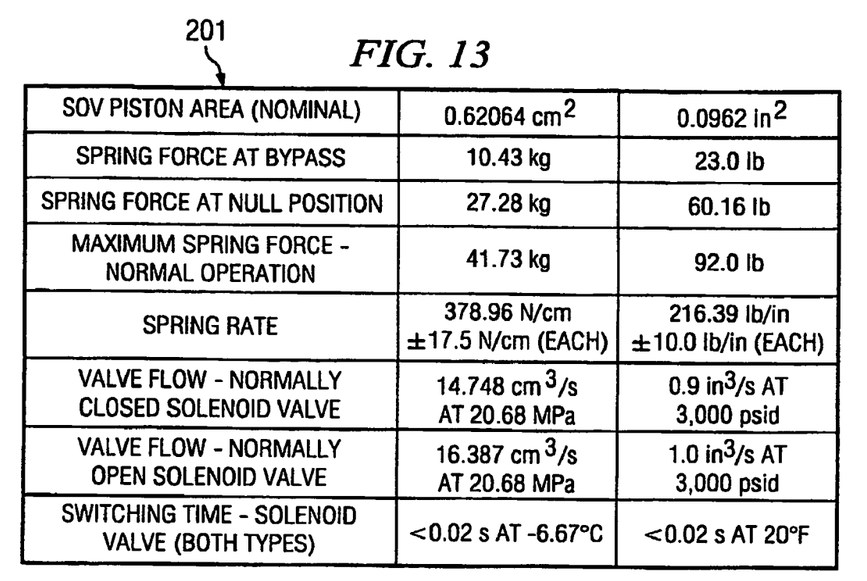
FIG. 13 is a table illustrating ITFV component parameters for bypass time for the present invention.
Figure 14:
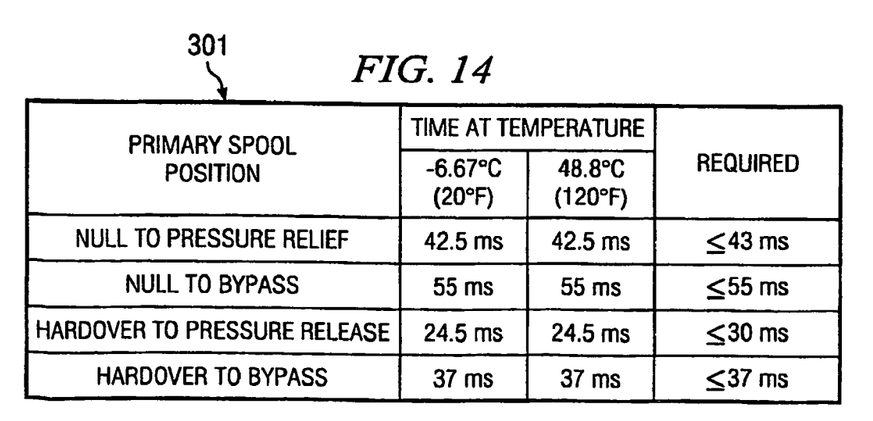
FIG. 14 is a table illustrating calculated time to bypass at selected operating temperatures for the present invention.

Although the present invention combines the three separate functions of bypass valve, delta pressure transducer, and PRV into a single valve assembly, the flexibility to refine components to meet selected performance requirements is not lost. For example, it is preferred that primary spools 159a and 159b fit with very close tolerances in order to minimize internal leakage; however, in order to achieve adequate delta pressure sensor accuracy, a loose spool fit that minimizes frictional effects is desired. Also, although both leakage and friction can be reduced by decreasing the ITFV spool diameter, the desire to have a minimum chip shear force of 890 N (200 lb) during bypass engagement requires a relatively large spool diameter. The following is an analysis of how bypass valve response time and delta pressure transducer accuracy can be selectively tailored by utilizing ITFV's 111a and Referring now to FIGS. 13 and 14 in the drawings, selected parameters for bypass time are illustrated in a tables 201 and 301. The severity of failure transient actuator motions is directly related to the speed in which an actuator can be placed into bypass. It is preferred that ITFV's 111a and 111b have a bypass time limit of 30 milliseconds. Although the large size of the primary spools 159a and 159b would make ITFV's 111a and 111b slower to respond than smaller dedicated bypass valve spools, because primary spools 159a and 159b also function as a delta pressure sensors and PRV's, force fight loads induced by EHSV 153 or other failures effectively preposition one of primary spools 159a or 159b closer to the bypass pass position. In addition, full bypass position is not required to disengage the failed actuator cylinder 175. Because the pressure relief ports are uncovered as primary spools 159a and 159b move to the bypass position, any ram force fight is significantly reduced at that valve position. Thus, the speed in which the dual ITFV assembly 151 can achieve effective bypass of a failed actuator cylinder 175 under force fight conditions is as fast as, if not faster than, the conventional designs. In FIG. 14, table 301 illustrates calculated times for the selected operating temperatures. The times listed are all inclusive of solenoid valve switching time.

Figure 15:
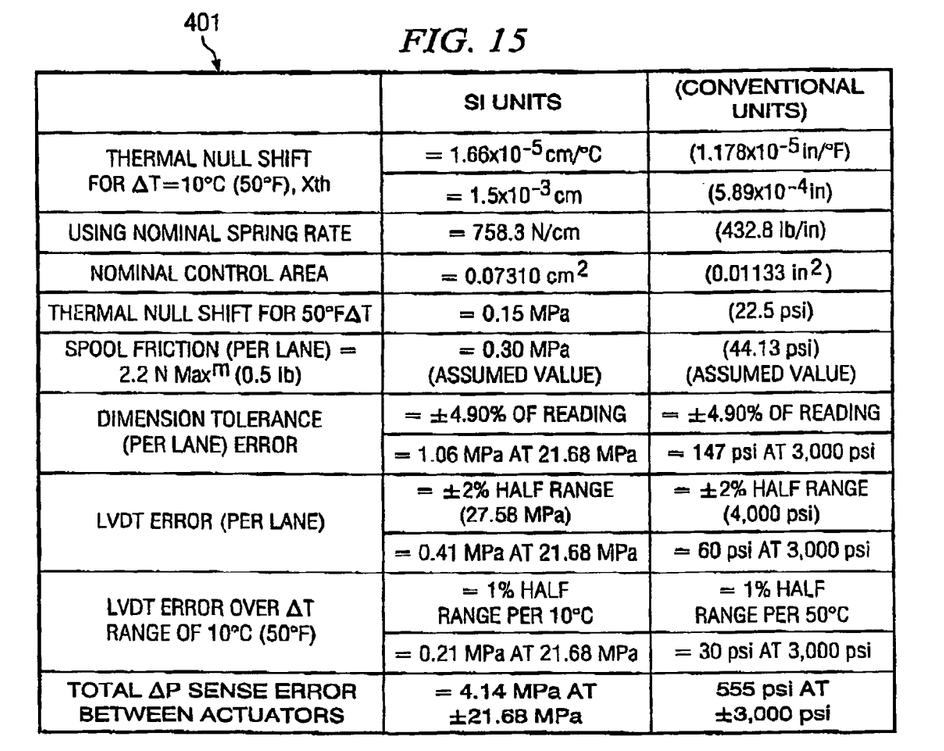
FIG. 15 is a table illustrating delta pressure sensor accuracy for the present invention.

Referring now to FIG. 15 in the drawings, delta pressure sensor accuracy is illustrated in a table 401. Accuracy of differential pressure setting is determined by dimensional variations resulting from a combination of manufacturing tolerances, such as LVDT sensitivity, spring rate, spool and sleeve diameters, and differential thermal expansion. Because the LVDT's 161a and 161b are also used to indicate the bypass positions of primary spools 159a and 159b, only 60% of the stroke of LVDT's 161a and 161b are used to measure delta pressure.

Generally, thermal effects influencing delta pressure accuracy are considered as absolute values. It is preferred that the sensor have an absolute accuracy requirement of ±2,068 kPa ([±300 psi]; a worst case ±4,137 kPa [±600 psi] between two sensors). However, because the purpose of the delta pressure sensors is to balance ram pressures relative to each other, it is acceptable to allow greater deviation in the absolute accuracy of the sensors, as long as the accuracy of the sensors relative to each other is maintained. According to a thermal analysis of the hydraulic systems, without failures, the worst case maximum difference between the three return system temperatures should never exceed 10° C. (50° F.). Therefore, between actuators, the difference in ITFV delta pressure readings when subjected to fluid temperatures within 10° C. (50° F.) is not allowed to exceed 4,137 kPa (600 psi) up to 20.68 MPa (3,000 psi). This accuracy between lanes falls within a selected requirement of 4,137 kPa (600 psi), even given an adverse buildup of tolerances. Allowing for sensitivity variations between LVDT's and manufacturing tolerances, ITFV lane-to-lane matching within a manifold is possible to within 13% of reading.

The integrated three function valve according to the present invention is less complex and more reliable than separately housed pressure transducers, bypass valves, and pressure relief valves. When used as a matched pair in a hydraulic actuator, ITFV's 111a and 111b provide redundant bypass valve, pressure relief valve, and delta pressure transducer functionality. This added redundancy is achieved with no additional LVDT's or wiring over conventional arrangements. This redundancy allows a control linkage or aerodynamic surface driven by multiple actuators to continue to operate safely following most common dual failures.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. An integrated three function hydraulic valve assembly comprising:
    a manifold;
    a primary spool disposed within the manifold;
    a pilot spool disposed within the manifold and operably associated with the primary spool;
    at least one spring for positioning the primary spool and the pilot spool; and
    a control system carried by the manifold for controlling the primary spool and the pilot spool;
    wherein the primary spool and the pilot spool operate to provide a bypass valve function, a pressure relief valve function, and a delta pressure transducer function.

2. The hydraulic valve assembly according to claim 1, wherein the primary spool has at least one differential area chamber.

3. The hydraulic valve assembly according to claim 1, wherein the primary spool has two opposing differential area chambers.

4. The hydraulic valve assembly according to claim 1, wherein the control system comprises:
    an electrohydraulic servo-valve in fluid communication with both the primary spool and the pilot spool having a servo-valve spool;
    at least one solenoid controlled valve in fluid communication with both the primary spool and the pilot spool;
    a first linear variable displacement transducer operably associated with the primary spool to indicate the location of the primary spool;
    a second linear variable displacement transducer operably associated with the servo-valve spool to indicate the location of the servo-valve spool; and
    a computer conductively coupled to the electrohydraulic servo-valve, the solenoid controlled valve, the first linear variable displacement transducer, and the second linear variable displacement transducer for receiving and transmitting operational instructions thereto.

5. The hydraulic valve assembly according to claim 1, further comprising:
    a filter means for filtering debris from the hydraulic valve assembly.

6. The hydraulic valve assembly according to claim 1, wherein the bypass valve function, the pressure relief valve function, and the delta pressure transducer function operate independently of each other.

7. A redundant control system for controlling an hydraulic actuator comprising:
    a manifold in fluid communication with the hydraulic actuator;
    a pair of integrated three function hydraulic valve assemblies, each hydraulic valve assembly comprising:
        a primary spool disposed within the manifold;
        a pilot spool disposed within the manifold and operably associated with the primary spool;
        a pair of centering springs for positioning the primary spool and the pilot spool; and
        a linear variable displacement transducer operably associated with the primary spool to indicate the location of the primary spool;
    a conduit system disposed within the manifold for placing both integrated three function hydraulic valve assemblies in fluid communication;
    a control system carried by the manifold for controlling the primary spools and the pilot spools;
    wherein the primary spools and the pilot spools operate to provide a redundant bypass valve function, a redundant pressure relief valve function, and a redundant delta pressure transducer function.

8. The redundant control system according to claim 7, wherein the control system comprises:
    an electrohydraulic servo-valve in fluid communication with both of the primary spools and both of the pilot spools having a servo-valve spool;
    two solenoid controlled valves in fluid communication with both of the primary spools and both of the pilot spools to facilitate the redundant bypass valve means;
    a first linear variable displacement transducer operably associated with the first primary spool to indicate the location of the first primary spool;
    a second linear variable displacement transducer operably associated with the second primary spool to indicate the location of the second primary spool;
    a third linear variable displacement transducer operably associated with the servo-valve spool to indicate the location of the servo-valve spool;
    a computer conductively coupled to the electrohydraulic servo-valve, both of the solenoid controlled valves, and all three of the linear variable displacement transducers for receiving and transmitting operational instructions thereto.

9. The redundant control system according to claim 7, wherein the bypass valve function, the pressure relief valve function, and the delta pressure transducer function operate independently of each other.

* * * * *